United States Patent
Nestel

(10) Patent No.: US 11,404,872 B2
(45) Date of Patent: Aug. 2, 2022

(54) AIRPORT ELECTRIC VEHICLE CHARGING SYSTEM

(71) Applicant: JBT AEROTECH CORPORATION, Chicago, IL (US)

(72) Inventor: Steven U. Nestel, Ogden, UT (US)

(73) Assignee: JBT AEROTECH CORPORATION, Chicago, IL (US)

( * ) Notice: Subject to any disclaimer, the term of this patent is extended or adjusted under 35 U.S.C. 154(b) by 79 days.

(21) Appl. No.: 16/862,323

(22) Filed: Apr. 29, 2020

(65) Prior Publication Data

US 2020/0346551 A1 Nov. 5, 2020

Related U.S. Application Data

(60) Provisional application No. 62/841,085, filed on Apr. 30, 2019.

(51) Int. Cl.
 *H02J 3/00* (2006.01)
 *H02J 3/02* (2006.01)
 (Continued)

(52) U.S. Cl.
 CPC ............. *H02J 3/02* (2013.01); *B60L 53/31* (2019.02); *B60L 53/53* (2019.02); *B60L 53/62* (2019.02);
 (Continued)

(58) Field of Classification Search
 CPC ...... H02J 3/02; H02J 1/001; H02J 1/14; H02J 7/0047; H02J 7/0068; B60L 53/31; B60L 53/62; B60L 2200/10; Y02T 90/12
 See application file for complete search history.

(56) References Cited

U.S. PATENT DOCUMENTS

| 6,803,746 B2 * | 10/2004 | Aker ................. H02J 7/022 320/139 |
| 7,461,516 B2 * | 12/2008 | Leadingham ........... B64F 1/364 62/236 |

(Continued)

FOREIGN PATENT DOCUMENTS

| DE | 20 2017 003 368 U1 | 11/2017 |
| EP | 2 305 510 A2 | 4/2011 |

(Continued)

OTHER PUBLICATIONS

International Search Report and Written Opinion, dated Jul. 15, 2020, issued in corresponding International Application No. PCT/US2020/030611, filed Apr. 30, 2020, 18 pages.

(Continued)

*Primary Examiner* — Naum Levin
(74) *Attorney, Agent, or Firm* — Christensen O'Connor Johnson Kindness PLLC

(57) ABSTRACT

In an embodiment, an airport electric vehicle charging system includes a current transducer electrically coupled with a power source; a solid state converter electrically coupleable with an aircraft at or near an airport gate and configured to provide and maintain power to the aircraft; and a controller. The system further includes a first feedback loop between the controller and the current transducer; a second feedback loop between the controller and the solid state converter; and a battery charger electrically coupled with the power source and configured to charge one or more electric vehicles. The first feedback loop provides a first feedback signal generated by the current transducer to the controller. The second feedback loop provides a second feedback signal generated by the solid state converter to the controller. The battery charger is configured to consume (Continued)

power from the power source in accordance with the first and second feedback signals.

10 Claims, 4 Drawing Sheets

(51) Int. Cl.
| | |
|---|---|
| *B60L 53/53* | (2019.01) |
| *B60L 53/62* | (2019.01) |
| *B60L 53/31* | (2019.01) |
| *H02J 7/00* | (2006.01) |
| *H02J 1/00* | (2006.01) |

(52) U.S. Cl.
CPC .............. *H02J 1/001* (2020.01); *H02J 7/007* (2013.01); *H02J 7/0013* (2013.01); *H02J 7/0047* (2013.01); *H02J 7/0068* (2013.01); *B60L 2200/10* (2013.01); *H02J 2207/20* (2020.01)

(56) References Cited

U.S. PATENT DOCUMENTS

| | | | |
|---|---|---|---|
| 7,573,228 B2 | 8/2009 | Karner et al. | |
| 7,612,514 B2 * | 11/2009 | Anghel | H02J 4/00 318/440 |
| 7,889,524 B2 * | 2/2011 | Lee | B60L 53/22 363/65 |
| 8,030,801 B2 * | 10/2011 | Mann, III | B64F 1/364 307/80 |
| 8,294,420 B2 | 10/2012 | Kocher | |
| 8,405,249 B2 * | 3/2013 | Leadingham | H02J 3/34 307/80 |
| 8,731,730 B2 | 5/2014 | Watkins et al. | |
| 8,890,473 B2 | 11/2014 | Muller et al. | |
| 9,102,240 B2 | 8/2015 | Poulsen | |
| 9,121,073 B2 | 9/2015 | Miller et al. | |
| 9,240,698 B2 | 1/2016 | Lee et al. | |
| 9,356,463 B2 | 5/2016 | Carroll | |
| 9,431,840 B2 | 8/2016 | Lee | |
| 9,575,533 B2 | 2/2017 | Watkins et al. | |
| 9,586,497 B2 | 3/2017 | Epstein et al. | |
| 9,669,720 B2 | 6/2017 | Higashi et al. | |
| 9,948,137 B2 | 4/2018 | Smith | |
| 9,973,028 B2 | 5/2018 | Namuduri et al. | |
| 10,014,790 B2 * | 7/2018 | Leadingham | H02M 5/458 |
| 10,056,763 B2 | 8/2018 | Kutkut | |
| 10,583,938 B2 * | 3/2020 | Mehrholz | H02J 9/062 |
| 10,589,874 B2 * | 3/2020 | Nestel | F02B 63/048 |
| 2005/0280399 A1 | 12/2005 | Karner et al. | |
| 2010/0231164 A1 | 9/2010 | Yang | |
| 2012/0074901 A1 | 3/2012 | Mohammed | |
| 2012/0091970 A1 | 4/2012 | Cho et al. | |
| 2013/0279212 A1 | 10/2013 | Leadingham | |
| 2015/0328999 A1 | 11/2015 | Dureau et al. | |
| 2016/0121735 A1 | 5/2016 | Sugano | |
| 2016/0193932 A1 | 7/2016 | Vaghefinazari | |
| 2017/0080808 A1 | 3/2017 | Bai et al. | |
| 2017/0337448 A1 | 11/2017 | Ng et al. | |
| 2018/0123360 A1 | 5/2018 | Eaves | |
| 2018/0159438 A1 | 6/2018 | Leadingham | |
| 2018/0170201 A1 | 6/2018 | Miller et al. | |

FOREIGN PATENT DOCUMENTS

| | | |
|---|---|---|
| EP | 2701942 A2 | 3/2014 |
| WO | 2010/132443 A1 | 11/2010 |
| WO | 2018/081549 A1 | 5/2018 |
| WO | 2018/202462 A1 | 11/2018 |
| WO | 2018202462 A1 | 11/2018 |

OTHER PUBLICATIONS

ACT, Quantum GSE, 2019, <https://act-chargers.com/wp-content/uploads/2018/06/ACT-Quantum-GSE-Charger-Cut-Sheet-1.pdf> [retrieved Mar. 5, 2019], 2 pages.
Altus, Introducing Altus; the Outdoor, Wireless Dual Port Chargers, Oct. 30, 2014, <http://www2.exide.com/Media/files/Downloads/IndustApac/Altus%20Brochure.pdf> [retrieved Mar. 5, 2019], 4 pages.
Morrow, K., et al., "Cost Benefit Analysis Modeling Tool for Electric vs. ICE Airport Ground Support Equipment—Development and Results," U.S. Department of Energy, Feb. 2007, <https://avt.inl.gov/sites/default/files/pdf/airport/GSECostBenefitSmall.pdf> [retrieved Mar. 5, 2019], 90 pages.
PosiCharge—Webasto, Smart Fast Charging Systems for Electric Airport Ground Support Equipment, 2019, <https://www.posicharge.com/airport-ground-support-equipment> [retrieved Mar. 5, 2019], 12 pages.
Simpliphi, Microgrid Powers 8 Hangar Bays at Kalaeloa Airport, 2019, <https://simpliphipower.com/deployments/commercial/airports/deployment-kalaeloa-airport-hanger/> [retrieved Mar. 5, 2019], 10 pages.

* cited by examiner

AIRPORT ELECTRIC VEHICLE CHARGING SYSTEM

CROSS-REFERENCES TO RELATED APPLICATIONS

This application claims the benefit of U.S. Provisional Application No. 62/841,085, filed Apr. 30, 2019, the disclosure of which are expressly incorporated herein by reference in their entirety.

BACKGROUND

Initiatives underway in various countries are driving electrification of equipment used in airports. Government subsidies, greater awareness about improving air quality, "green" initiative grants, advancements in battery technology, laws in certain jurisdictions requiring reduction or elimination of diesel or gas powered engines, and/or the like support transitioning to use of electric powered equipment (e.g., loaders, baggage tractors, aircraft towers, etc.) in airports.

Although there are clear advantages to converting to electric power from diesel, gas, or similar power sources, the transition is not without difficulty. Among other things, existing electric charging systems may not be directly deployable in airport environments due to power requirements and regulations specific to airports. Installing electric charging systems in airports may involve high construction costs, high installation costs, and/or significant changes may be required to existing infrastructure.

Accordingly, it would be beneficial to have electric charging systems deployable in airports having low installation costs, minimal impact on existing infrastructure, without negative impact to existing systems and requirements, have flexibility to handle a variety of electric powered equipment, and/or the like.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an airport electric vehicle charging system includes a current transducer electrically coupled with a power source; a solid state converter electrically coupleable with an aircraft at or near an airport gate and configured to provide and maintain power, from the power source, to the aircraft at a power level requested by the aircraft; and a controller. The system further includes a first feedback loop between the controller and the current transducer; a second feedback loop between the controller and the solid state converter; and a battery charger electrically coupled with the power source and configured to charge one or more electric vehicles. The first feedback loop provides a first feedback signal generated by the current transducer to the controller. The second feedback loop provides a second feedback signal generated by the solid state converter to the controller. The battery charger is configured to consume power from the power source in accordance with the first and second feedback signals.

In some embodiments, an airport electric vehicle charging system includes a solid state converter electrically coupleable with an aircraft at or near an airport gate and configured to provide and maintain power, from a power source, to the aircraft at a power level requested by the aircraft; a load sharing controller electrically coupled between the power source and the solid state converter; and a battery charger electrically coupled with the load sharing controller. The system further includes a vehicle charger configured to charge one or more electric vehicles at or near the airport gate; and a battery bank comprising one or more batteries electrically coupled between the battery charger and the vehicle charger. The solid state converter provides a feedback signal indicative of power consumption by the aircraft to the load sharing controller. The load sharing controller is configured to determine a control signal indicative of a maximum excess available power level for the battery charger based on at least the feedback signal. The battery charger is configured to limit power consumption from the power source in accordance with the control signal.

In some embodiments, an airport electric vehicle charging system includes: a current transducer directly electrically coupled with a power source; a solid state converter electrically coupleable with an aircraft at or near an airport gate and configured to provide and maintain power, from the power source, to the aircraft at a power level requested by the aircraft; a controller outside of a direct electrical path from the power source to the current transducer; and a battery charger electrically coupled with the power source and configured to charge one or more electric vehicles.

In an embodiment, the solid state converter is configured to consume power from the power source based on: a first feedback loop between the controller and the current transducer, where the first feedback loop provides a first feedback signal generated by the current transducer to the controller; and a second feedback loop between the controller and the solid state converter. The second feedback loop provides a second feedback signal generated by the solid state converter to the controller.

In an embodiment, the airport electric vehicle charging system also includes: a battery bank having one or more batteries electrically coupled with the battery charger, a local battery charging line coupling the battery bank and the battery charger, the local battery charging line being configured for receiving power from the battery charger; and a local battery supply line coupling the battery bank and the battery charger. The local battery supply line is configured for providing power to the battery charger. The battery bank is configured to receive power from and provide power to the battery charger based on at least one of a battery monitor and identification device (BMID) charge control signal generated by the local battery bank and a maximum available excess power signal generated by the controller.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
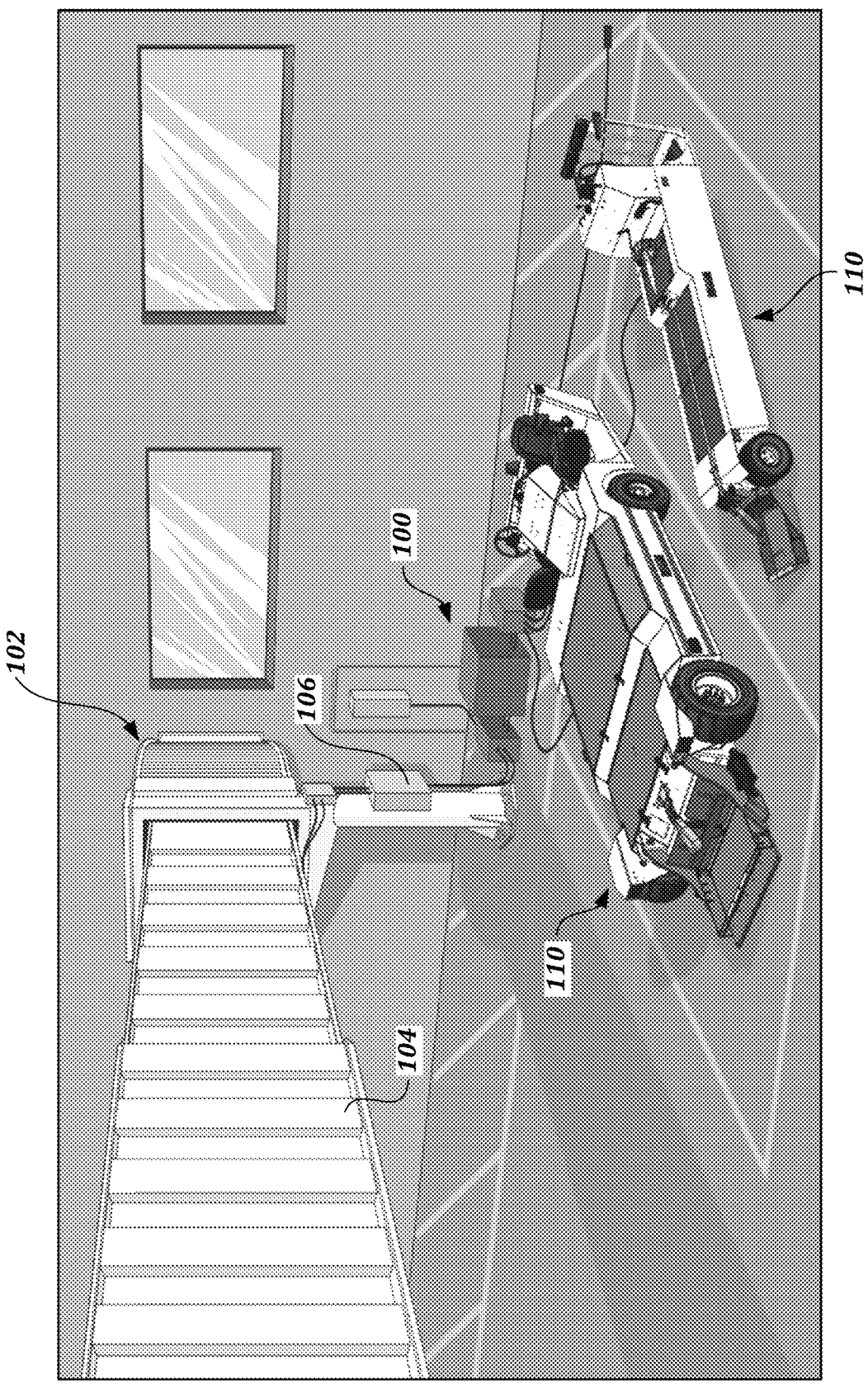
FIG. 1 is an example illustration of an electric vehicle charging system installed in an airport in accordance with some embodiments of the present disclosure.

Embodiments of apparatuses and methods relate to electric vehicle charging in airports. In some embodiments, an airport electric vehicle charging system includes a current transducer electrically coupled with a power source; a solid state converter electrically coupleable with an aircraft at or near an airport gate and configured to provide and maintain power, from the power source, to the aircraft at a power level requested by the aircraft; a controller; a first feedback loop between the controller and the current transducer; a second feedback loop between the controller and the solid state converter; and a battery charger electrically coupled with the power source and configured to charge one or more electric vehicles. The first feedback loop provides a first feedback signal generated by the current transducer to the controller. The second feedback loop provides a second feedback signal generated by the solid state converter to the controller. The battery charger is configured to consume power from the power source in accordance with the first and second feedback signals. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

FIG. 1 is an example illustration of an electric vehicle charging system 100 installed in an airport in accordance with some embodiments of the present disclosure. System 100 is located near a ramp or gate rotunda 102 to use pre-existing power infrastructure available for the passenger boarding bridge 104 and/or aircrafts (not shown) located proximate to the gates. For instance, without limitation, system 100 can be installed at or near the rotunda column.

System 100 is configured to load share power with an aircraft and charge one or more electric vehicles, ground support equipment (GSEs), and/or the like (collectively referred to as electric GSEs 110) using an existing power feed traditionally available at the gate rotunda 102 for providing electric power to the aircraft. Use of the existing power feed eliminates the need to install additional power feeds to charge the electric GSEs 110. System 100 eliminates the need to install additional power feeds, while still satisfying all the power needs of the aircraft, and providing localized and potentially even simultaneous fast charging of a plurality of electric GSEs 110. Electric GSEs 110 can include, without limitation, baggage tractors, belt loaders, pushback tractors, cargo loaders, catering trucks, fuel service vehicles, electric powered transport equipment used in airports, and/or the like.

Figure 2:
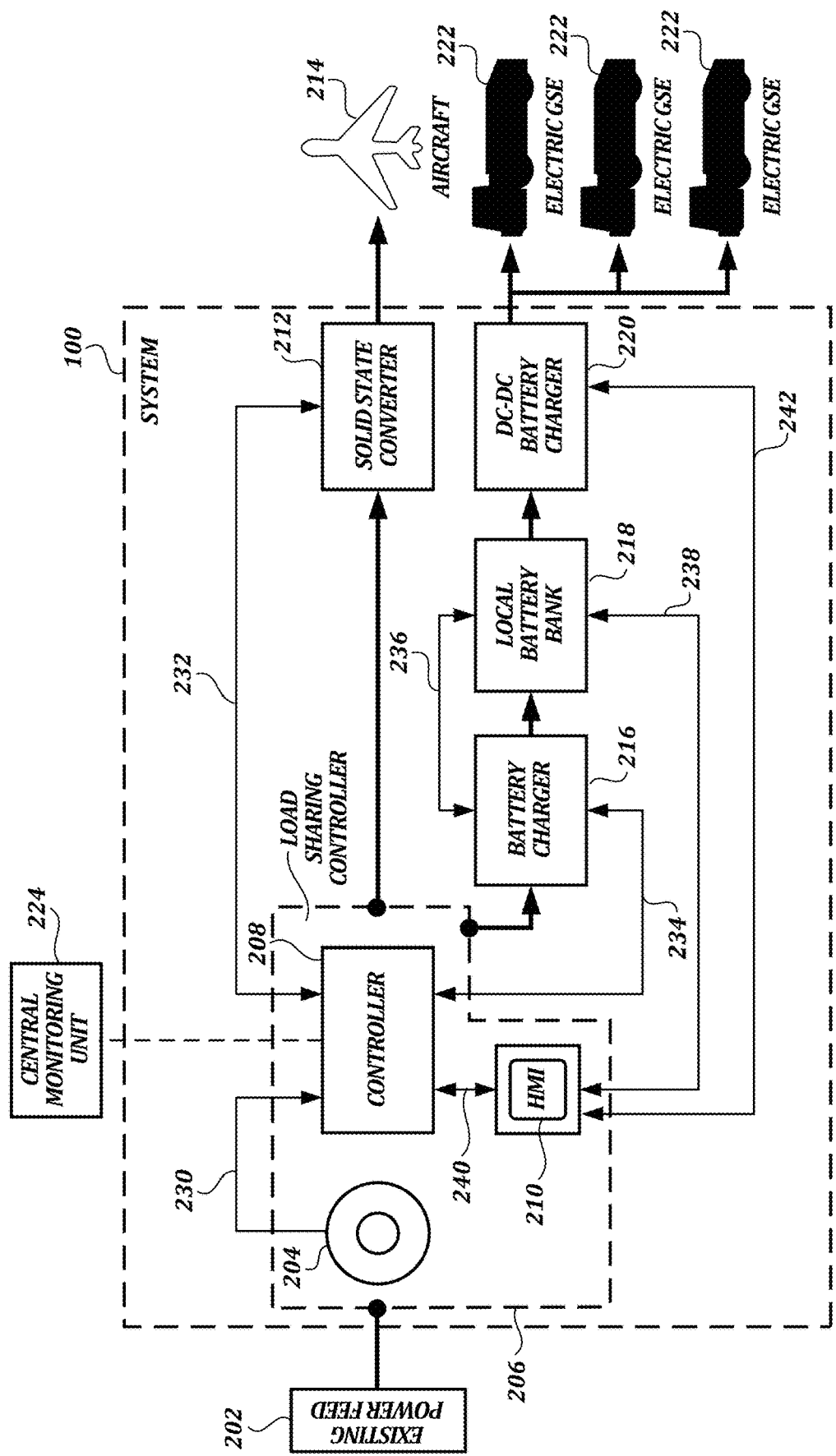
FIG. 2 is an example illustration of a block diagram of the system in accordance with some embodiments of the present disclosure.

FIG. 2 is an example illustration of a block diagram of the system 100 in accordance with some embodiments of the present disclosure. System 100 includes a load sharing controller 206, a solid state converter 212, a battery charger 216, a local battery bank 218, and a direct current (DC)-DC battery charger 220. The output of an existing power feed 202 is the input to the load sharing controller 206. The load sharing controller 206 is electrically coupled between the existing power feed 202 and the solid state converter 212. The load sharing controller 206 is also electrically coupled between the existing power feed 202 and the battery charger 216. The local battery bank 218 is electrically coupled between the battery charger 216 and the DC-DC battery charger 220. The output of solid state converter 212 is the input to an aircraft 214 located at or near the gate rotunda 102. The output of DC-DC battery charger 220 comprises the input to each of one or more electric GSEs 222.

Solid state converter 212 comprises an aircraft powering branch of system 100. Battery charger 216, local battery bank 218, and DC-DC battery charger 220 comprise an electric GSE charging branch of system 100.

The existing power feed 202 is located at the gate, gate rotunda, or airport building. For example, a power box 106 mounted on a rotunda column (see FIG. 1) may comprise the power output point of the existing power feed 202. In an embodiment, existing power feed 202 and power box 106 comprise pre-existing power infrastructure at the gate rotunda 102. The output of existing power feed 202 comprises an alternating current (AC) current or voltage (e.g., at a frequency of 50 Hertz (Hz), 60 Hz, 400 Hz, etc.). The maximum output power available from the existing power feed 202 can be approximately 125 Amps (A), less than 125 A, more than 125 A, and/or the like. As will be described in detail below, system 100 is configured to draw a certain amount of power from the existing power feed 202, drawing up to the maximum output power available from the existing power feed 202. Existing power feed 202 may also be referred to as gate power source, airport building power source, airport gate rotunda power source, AC power source, power source, and/or the like.

In an embodiment, load sharing controller 206 is configured to control load sharing between the aircraft powering branch and the electric GSE charging branch of system 100. Load sharing controller 206 monitors and manages the distribution/sharing of power from the existing power feed 202 to one or both of the solid state converter 212 and battery charger 216. The load sharing controller 206 has one power input (from the existing power feed 202) and two power outputs—a first power output that is the input to the solid state converter 212 and a second output that is the input to the battery charger 216. Load sharing controller 206 includes a current transducer 204, a controller 208, and an interface unit 210.

Current transducer 204 is electrically coupled with the existing power feed 202. For example, current transducer 204 can be electrically coupled with a power output connector of the power box 106. Current transducer 204 is configured to measure the power drawn from the existing power feed 202 and continuously detects/monitors the amount of power flowing to the load sharing controller 206 (e.g., the power being consumed by system 100). The current transducer 204 generates a voltage signal that is proportional to the total amount of current flowing to the load sharing controller 206 in response to the detection. For example, 100 A current flowing to load sharing controller 206 generates a 10 Volt (V) signal by the current transducer 204. The signal generated by the current transducer 204 indicative of the amount of current flowing to the load sharing controller 206 is communicated to controller 208 included in the load sharing controller 206 via a communication line 230. The signal indicative of the amount of current flowing to the load sharing controller 206 may also be referred to as a current feedback and the communication line 230 may also be referred to as a current feedback loop.

Controller 208 comprises a computer, computing device, processor, and/or the like. Interface unit 210, also referred to as a human machine interface (HMI), comprises a display capable of presenting information to users and one or more mechanisms capable of receiving user inputs. Interface unit 210 is in communication with the controller 208. Load sharing controller 206 may also be referred to as LSC.

Solid state converter 212 is configured to convert power from the existing power feed 202 into a format, as needed, suitable for an aircraft 214 plugged in and requesting power (e.g., provide aircraft-compatible power to aircraft 214). Aircraft 214 can comprise any of a variety of aircraft types, models, and/or configurations. For example, power from the existing power feed 202 comprises AC current at 60 Hz while aircraft 214 requires AC current at 400 Hz. Thus, solid state converter 212 converts the incoming power and outputs power at 400 Hz to the aircraft 214. As another example, power from the existing power feed 202 comprises AC current at 400 Hz so solid state converter 212 may not be needed or may be replaced with a gate box and the 400 Hz power can be outputted to aircraft 214.

Solid state converter 212 also continuously monitors one or more parameters associated with power being consumed by the aircraft 214 such as, but not limited to, voltage, current, and frequency, quantity of aircraft power consumption, quality of aircraft power consumption, and/or the like. Solid state converter 212 may also track other power consumption state information about aircraft 214. For example, the amount of time aircraft 214 has been plugged in and requesting power may be tracked, power consumption as a function of time by aircraft 214 that may correlate to known power consumption cycles or trends (e.g., power consumption is high in initial time periods, then is reduced by half in intermediate time periods, then increases in the end time periods, etc.), and/or the like. One or more of such monitored power parameters as well as other tracked aircraft associated information (collectively referred to as aircraft power data or aircraft power feedback) are provided from the solid state converter 212 to controller 208 included in the load sharing controller 206 via a communication line 232. Communication line 232 forms an aircraft power feedback loop.

Battery charger 216 is configured to draw power from existing power feed 202 in accordance with a control signal provided on a communication line 234 from the controller 208 included in the load sharing controller 206, as will be described in detail below. Battery charger 216 is configured for variable charging power limit. Battery charger 216 converts the received AC power into DC power, which in turn is provided to local battery bank 216.

Local battery bank 218 is configured to store energy provided by battery charger 216. Local battery bank 218 permits power not used by aircraft 214 to be stored so that electric GSEs 222 can be charged whether or not sufficient power is presently available from the existing power feed 202 and/or aircraft 214 is consuming power from the existing power feed 202. Local battery bank 218 is opportunistically charged from excess power available at the existing power feed 202 (e.g., power not needed by aircraft 214).

Local battery bank 218 comprises one or more battery packs that are scalable to match anticipated electric GSE charging load, whether that is based on the anticipated number of electric GSEs to be charged, the particular charging requirements of the electric GSEs to be charged, full or partial charging is to be performed, and/or the like. Local battery bank 218 may comprise a variety of battery types (e.g., lithium ion batteries, lead acid batteries, etc.), a variety of external packaging (e.g., packaged for outdoor use, packaged as a single component or multiple components), and/or the like since there is little or no size or weight constraints for fixed installations.

In an embodiment, local battery bank 218 is sized to be able to simultaneously charge a plurality of electric GSEs 222 plugged in at all charging ports and even simultaneously fast charge the plurality of electric GSEs 222. In some embodiments, local battery bank 218 generates and provides a battery charge control signal to battery charger 216 via a communications line 236. The battery charge control signal comprises a battery monitor and identification device (BMID) charge control signal that identifies the type(s) of batteries included in the local battery bank 218, amount of power desired for charging at the present time, preferred battery charging rate, and/or the like (collectively referred to as charging requirements associated with the batteries of the local battery bank 218). Battery charger 216 can intelligently charge the local battery bank 218 based on such real-time (or near real-time) battery charge control signal.

Local battery bank 218 can be further configured to generate and provide battery state information to interface unit 210 via a communications line 238. Battery state information can include information about available battery power level at the local battery bank 218 for vehicle GSE charging, discharge rate of local battery bank 218, whether the local battery bank 218 is being charged, other state information about the local battery bank 218, and/or the like.

Local battery bank 218 outputs stored energy (e.g., DC current) to DC-DC battery charger 220 in accordance with the electric GSE(s) 222 to be charged. DC-DC battery charger 220 comprises a vehicle battery charger for the electric GSEs 222 and may also be referred to as a vehicle charger, DC-DC vehicle charger, or the like. DC-DC battery charger 220 is configured to provide an appropriate DC current level to each of the electric GSEs 222 being charged. Since the input to DC-DC battery charger 220 is DC power, an AC-DC rectifier or other AC to DC conversion component(s) can be omitted, disabled, or bypassed in the DC-DC battery charger 220.

DC-DC battery charger 220 is capable of pulling a large load from the local battery bank 218 that exceeds the maximum power capacity of the existing power feed 202. For example, the total power load required to simultaneously charge a plurality of vehicle GSEs 222, simultaneously fast charge a plurality of vehicle GSEs 222, fast charge one or more vehicle GSEs 222, and/or the like can be greater than what can be provided from the existing power feed 202, even if aircraft 214 is not drawing any power or there is no aircraft plugged into the system 100. Because the local battery bank 218 has sufficient storage capacity to provide high current loads, DC-DC battery charger 220 can draw power from the local battery bank 218 that exceeds the rotunda's/building's nominal power feed capacity.

DC-DC battery charger 220 is further configured to generate and provide electric GSE charging state information to interface unit 1210 via a communication line 242. Electric GSE charging state information can include the amount of power consumed during charging, the type of charging (e.g., fast charging or regular charging), identification of vehicle GSEs undergoing charging, historical record of previous charging sessions, other state information about the DC-DC battery charger 220, and/or the like.

In some embodiments, the interface unit 210 is further configured to receive an interface signal (also referred to as a HMI signal) from controller 208 via a communication line 240. The interface signal provides operational parameters about the system 100 such as, but not limited to, amount of power consumption by aircraft 214, amount of power consumption by battery charger 216, and/or the like. Interface unit 210 displays at least a portion of the received battery state information, electric GSE charging state information, and content of the interface signal and/or uses such information to generate other information to present to users. In response to the displayed information, a user (e.g., an airport ground crew member) may change certain operational parameters, input operational preferences, fine tune operation of system 100, gain knowledge about electric GSE charging, and/or the like by interfacing with interface unit 210.

Electric GSEs 222 are similar to electric GSEs 110. In some embodiments, a battery charge control signal similar to that generated by local battery bank 218 can also be generated by each of the electric GSEs 222 and provided to the DC-DC battery charger 220 to facilitate intelligent charging of electric GSEs 222.

Central monitoring unit 224 comprises a centralized system configured to receive operational or state data from a plurality of devices, equipment, and systems located in an airport. The system 100, passenger boarding bridges (e.g., boarding bridge 104), air conditioners, heating systems, airport trams, and/or the like of an airport are examples of devices that can provide operational/state data to central monitoring unit 224. In an embodiment, controller 208 can be configured to generate and communicate operational/state data about system 100 to central monitoring unit 224. Examples of operational/state data provided by controller 208 includes, without limitation, the amount of power being provided to solid state converter 212, the amount of power being provided to battery charger 216, unique identifiers of electric GSEs 222 being charged, historical power consumption data, faults, alarms, other usage information about components included in the system 100, and/or the like. In this manner, central monitoring unit 224 not only serves as a collation point of airport data but can also facilitate fault diagnosis, fault detection, usage trend or pattern identification, intelligent airport design, resource allocation, and/or the like.

Central monitoring unit 224 can comprise a server, computer, database, processor, and/or the like. Central monitoring unit 224 can be adjacent to or remote from the system 100. Central monitoring unit 224 can comprise one or more units. For example, a different central monitoring unit may exist for each of the different airport terminals of an airport or a single central monitoring unit can be implemented at an airport control center for the entire airport. Central monitoring unit 224 can obtain operational/state data via a wired and/or wireless connection with the various devices of the airport. For example, controller 208 can include wireless communication components to broadcast the operational/state data.

In some embodiments, data monitored by the central monitoring unit 224 facilitates management of diversity factor associated with the airport (or sections of the airport). Diversity factor is the overall airport duty cycle of equipment. Airport power capacity is designed around specific diversity factors. Diversity factor is defined as:

$$\text{Diversity factor} = \frac{\text{sum of individual maximum demands}}{\text{coincident maximum demand of whole system}}.$$

New equipment peak loads and its total load over time affect the diversity factor. System 100 allows control of diversity factor by having the ability to set the maximum battery charger current, which impacts the numerator of the equation above, and also having the ability to set active times for the battery charger, which impacts the denominator of the equation above. Accordingly, an airport using the system 100 can control the resulting diversity factor, if needed.

Figure 3:
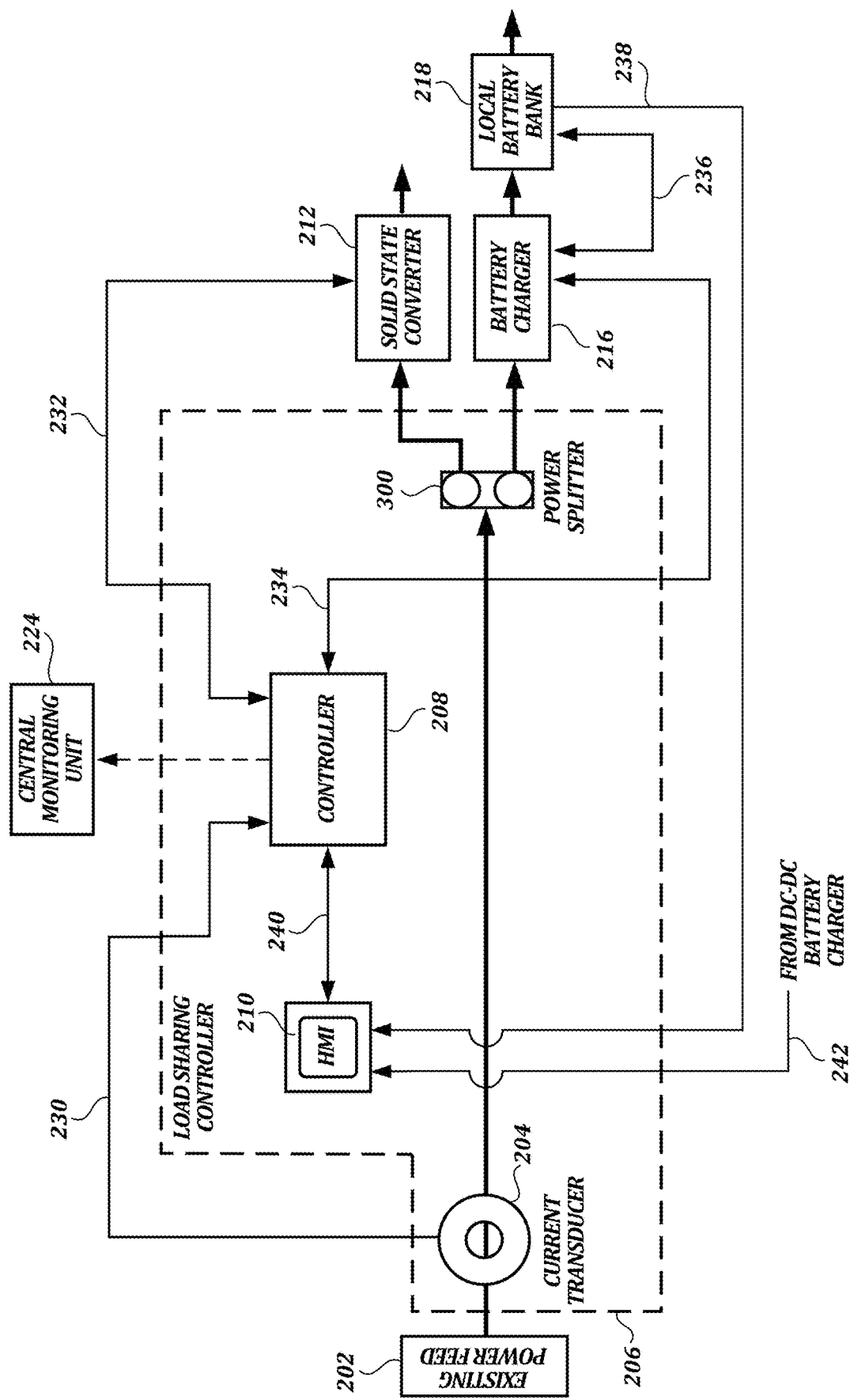
FIG. 3 is an example illustration showing additional details of a load sharing controller in accordance with some embodiments of the present disclosure.

FIG. 3 is an example illustration showing additional details of the load sharing controller 206 in accordance with some embodiments of the present disclosure. In addition to current transducer 204, controller 208, and interface unit 210, load sharing controller 206 further includes a power splitter 300. Power splitter 300 comprises a passive electrical element that splits the incoming power into two power streams. Power splitter 300 includes one input and two outputs. The input of power splitter 300 electrically couples with the output of existing power feed 202, the first output of power splitter 300 electrically couples with the solid state converter 212, and the second output of power splitter 300 electrically couples with the battery charger 216.

In some embodiments, controller 208 and interface unit 210 include, or have access to, a non-transitory computer-readable medium having computer-executable instructions for performing the operations described herein.

The controller 208 is configured to process the current feedback (from current transducer 204) and the aircraft power feedback (from solid state converter 212) to determine how much power should be available for the battery charger 216. Current feedback quantifies the instantaneous power being consumed by the system 100 (e.g., by aircraft 214 via solid state converter 212 and the battery charger 216). Aircraft power feedback provides advanced notification of changing aircraft load, quantity and quality of power consumption (e.g., voltage, current, frequency) by the aircraft 214, diagnostic data associated with the aircraft 214, and/or the like. Controller 208 determines the maximum excess power available for the battery charger 216 based on the current feedback and the aircraft power feedback.

Although controller 208 is configured to provide load sharing between the solid state converter 212 and the battery charger 216, power requirement of the aircraft 214 is prioritized at all times so that the aircraft 214 receives whatever amount of power it needs at all times. Power consumption by aircraft 214 is therefore unrestricted and uninterrupted as if the electric GSE branch of system 100 is absent. Only power available at the existing power feed 202 in excess of the power consumed and/or anticipated to be consumed by the aircraft 214 will be available for consumption by the battery charger 216.

Controller 208 generates a control signal indicative of the maximum excess power available for the battery charger 216 based on the current feedback and the aircraft power feedback. The control signal specifies the maximum amount of power that can be drawn by the battery charger 216. The control signal can be a digital or analog signal indicating 0-100% power in continuous or discrete steps. For example, the control signal can be a variable duty-cycle square wave, a 0-10 V signal, or the like. The control signal, also referred to as a maximum available excess power signal, is communicated to battery charger 216 via the communication line 234. As the power consumption and needs of the aircraft 214 decreases, the maximum level of power that the battery charger 216 can access increases.

In some embodiments, the control signal to the battery charger 216 also specifies a (continuous) minimum amount of power to be drawn/consumed by the battery charger 216. A continuous minimal power draw permits the battery charger 216 to maintain at least a minimal continuous charging of the local battery bank 218 to prevent starts/stops on local battery bank charging.

In response to the control signal, battery charger 216 draws or consumes power from the existing power feed 202 based on power requirements associated with the local battery bank 218, up to the maximum power limit specified in the control signal. For example, without limitation, the BMID charge control signal received from the local battery bank 218 can specify the amount of power preferred by the batteries included in the local battery bank 218. Battery charger 216 processes the BMID charge control signal and determines the actual amount of power to draw from the existing power feed 202 via the power splitter 300 based on the power requirements provided in the BMID charge control signal and the maximum available excess power control signal. If the preferred/requested amount of power specified in the BMID charge control signal is greater than the maximum available excess power specified in the maximum available excess power control signal, then battery charger 216 may draw a power amount equal to the maximum available excess power specified in the maximum available excess power control signal and provide such power amount to the local battery bank 218, even though such power amount is less than the amount indicated in the BMID charge control signal. If the preferred/requested amount of power specified in the BMID charge control signal is less than the maximum available excess power specified in the maximum available power control signal, then battery charger 216 may only draw a power amount that is equal to the preferred/requested amount of power, thereby underutilizing the amount of power available to be consumed without impacting aircraft 214 needs.

Accordingly, even though the controller 208 determines the maximum amount of power from the existing power feed 202 that can be used by the battery charger 216, it is the battery charger 216 that makes the final determination as to the exact power amount to draw or consume from the existing power feed 202, within the power limit(s) set by the controller 208 via the maximum available excess power control signal.

The electric GSE charging branch of system 100 permits opportunistic charging (e.g., consume power when available from existing power feed 202) while providing independent and full electric GSE charging capabilities (e.g., power delivery on demand). The inclusion of the local battery bank 218 allows time-shifted power delivery, in which the time of power consumption from the existing power feed 202 is decoupled or independent of power delivery to charge the electric GSEs. Even if no or low amount of power is presently available from the existing power feed 202 to battery charger 216, energy stored in the local battery bank 218 permits one or more electric GSEs 222 to undergo uninterrupted charging, fast charging, simultaneous charging of a plurality of electric GSEs 222, and/or the like.

In this manner, dual feedback loops to the load sharing controller 206 facilitates real-time or dynamic load sharing of power, from a rotunda/gate/building (e.g., existing power feed 202), between the solid state converter 212 and battery charger 216. The full power needs of the aircraft 214 are met and prioritized at all times. Existing gate operations, including providing power to aircraft 214, are not diminished by the system 100. Based on the present power needs of the aircraft 214, load sharing controller 206 generates a control signal to the battery charger 216 specifying a maximum power that can be consumed by the battery charger 216, so as to prevent the battery charger 216 from drawing more power than is available given the present power needs of the aircraft 214. If there is no aircraft 214 connected to the solid state converter 212 or aircraft 214 has low power needs, then the control signal to battery charger 216 specifies a high (or higher) maximum power since load sharing permits most (or more) of the power from existing power feed 202 to be used by the battery charger 216.

Figure 4:
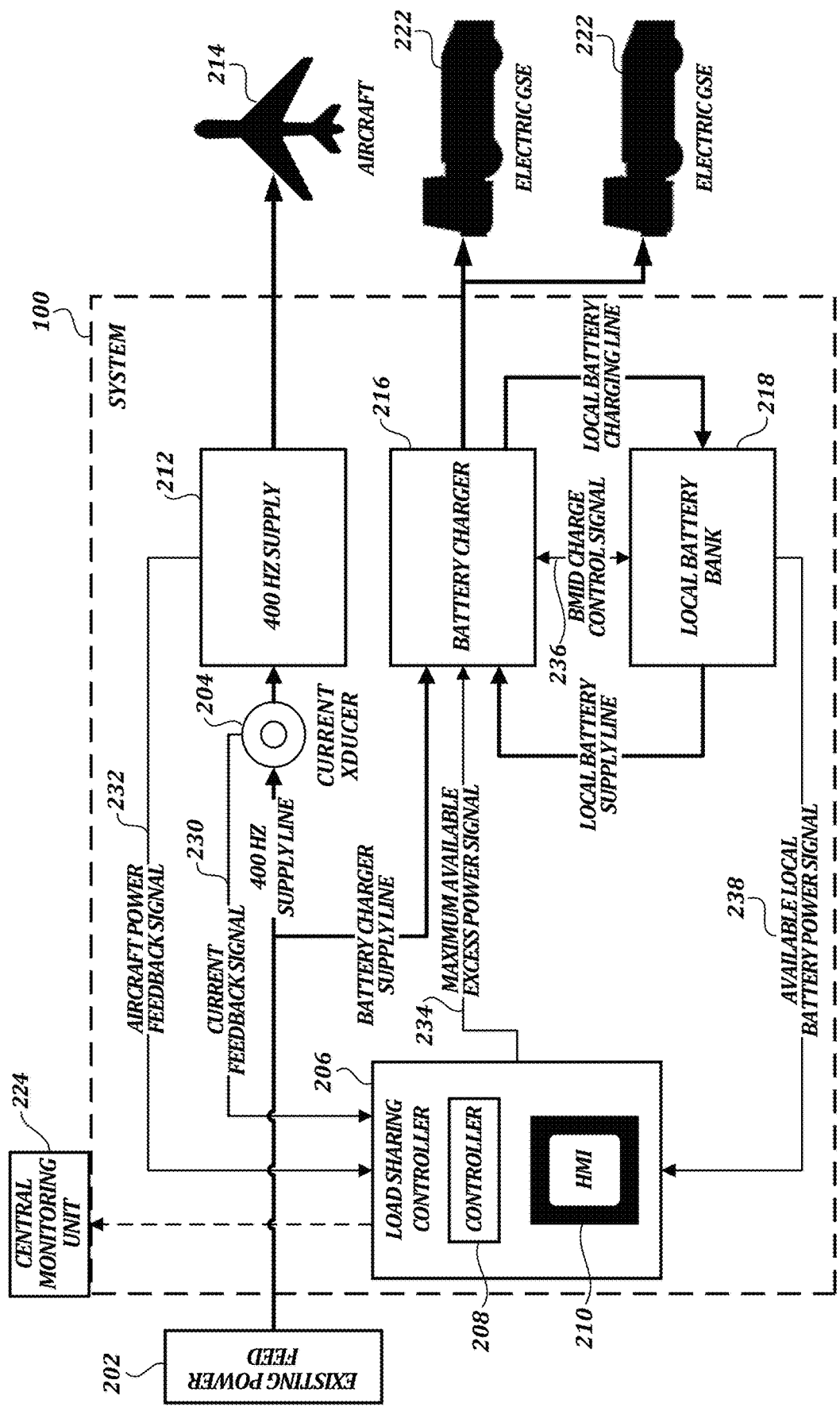
FIG. 4 is an example illustration of a block diagram of the system in accordance with some embodiments of the present disclosure.

FIG. 4 is an example illustration of a block diagram of the system 100 in accordance with some embodiments of the present disclosure. For brevity and conciseness, those parts of illustrated system 100 that are similar to system 100 shown in FIG. 2 are not described in detail here. The output of an existing power feed 202 may be directly fed to the input to current transducer 204 without intervening elements (e.g., an intervening controller). As a result, the load sharing controller 206 and/or a connection between the existing power feed 202 and the current transducer 204 may be simplified and high voltage power need not be passed through the load sharing controller 206. Power is further provided to the solid state converter (also referred to as "400 Hz supply") 212. Aircraft 214 (if present at the gate) is provisioned with the AC power through solid state converter 212.

Power feed 202 also provides power to a battery charger 216 through a battery charger supply line. In some embodiments, battery charger 216 is configured to draw power from existing power feed 202 in accordance with a control signal provided on communication line 234 ("maximum available excess power signal") from load sharing controller 206 (e.g., from controller 208). Battery charger 216 converts the received AC power into DC power, which in turn is provided to one or more GSEs 222 and/or to local battery bank 218 through a local battery charging line.

Local battery bank 218 is configured to store energy provided by battery charger 216, for example when the power producing capability of the battery charger 216 is not fully utilized by the GSEs 222. In operation, depending on the BMID charge control signal 236, local battery bank 218 may provide its stored energy back to the battery charger through a local battery supply line. In some embodiments, the process of storing excess energy in the local battery bank 218 and providing the stored energy back to battery charger 216 (and further to electric GSEs 222) smooths the energy consumption of battery charger 216 by "shaving off" the peaks in power demand that would otherwise have to be provided solely by battery charger 216. As a result, electric GSEs 222 can be charged based on augmenting the power-providing capability of the battery charger 216 with the stored energy from local battery bank 218. Flow of energy between the battery charger 216 and the local battery bank 218 may be controlled by BMID charge control signal 236 based on, for example, power demand by the GSEs 222, the type(s) of batteries included in the local battery bank 218, amount of power desired for charging at the present time, preferred battery charging rate, and/or the like (collectively referred to as charging/discharging requirements associated with the batteries of the local battery bank 218). In some embodiments, the flow of energy between the battery charger 216 and the local battery bank 218 may be based on time of day and the cost of power. For example, the battery charger 216 may charge the local battery bank 218 when the cost of power is lower. Conversely, the battery bank 218 may serve as a power source when power costs more. Battery charger 216 can intelligently charge or draw power from the local battery bank 218 based on real-time (or near real-time) BMID charge control signal.

Local battery bank 218 can be further configured to generate and provide battery state information to load sharing controller 206 via a communications line 238. The load sharing controller 206 also receives control inputs through the communication line 230 and the communication line 232 that collectively form an aircraft power feedback loop. In some embodiments, the communication line 230 provides a signal that is indicative of the amount of current flowing through the current transducer 204 ("current feedback signal"), whereas the communication line 232 provides a signal that is indicative of the aircraft power ("aircraft power feedback loop"). Signal provided on the communication line 232 may be viewed as an intelligent signal that allows the system to predict future aircraft power changes and provides for advanced load sharing capabilities. Such capability is included in other instances of the communication line 232 described elsewhere in this specification. In operation, load sharing controller 206 is configured to control load sharing between the solid state converter 212 and the battery charger 216 of system 100. In some embodiments, load sharing controller 206 includes controller 208, and interface unit 210.

System 100 is designed to use existing power infrastructure (e.g., existing power feed 202) without need for installation of a new power feed, power drop, or power connection point. System 100 has a small footprint and can be located near the gate rotunda or building wall with minimal construction requirements. System 100 protects, maintains, and prioritizes meeting aircraft power requirements with load sharing to the battery charger 216 during times of low aircraft loads, high aircraft loads, and while aircrafts are not plugged in for power. The local battery bank 218 included in the system 100 stores power when excess power is available and permits charging of electric GSEs 222 at whatever schedule is convenient for electric GSE operations. Opportunistic storage of power provided by the local battery bank 218 effectively doubles or triples the gate's power output without requiring new wiring or construction. Electric GSE charging can be simultaneous for a plurality of electric GSEs, without interruption (e.g., continuous charging), fast charging, intelligent charging, trickle charging, and/or the like. A dual aircraft powering and electric GSE charging system such as system 100 can be located at any gate or rotunda.

In some embodiments, one or more components included in system 100 may be optional. For instance, without limitation, interface unit 210, local battery bank 218, and/or central monitoring unit 224 may be optional. Local battery bank 218 may be omitted if storage of energy from existing power feed 202 is not needed in order to meet electric GSE charging requirements. Central monitoring unit 224 may be optional where an airport does not require centralized state information about gate operations and equipment. Power inputted to system 100 can be provided from a variety of power sources. Existing power feed 202, for example, can comprise a 400 Hz power feed, be sourced from an airport centralized 400 Hz power system, part of the passenger boarding bridge, part of airport preconditioned air units (PCAs), and/or the like. DC-DC battery charger 220 may include one or more vehicle charging cables. DC-DC battery charger 220 may comprise one or more vehicle chargers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

I claim:

1. An airport electric vehicle charging system comprising:
 a current transducer electrically coupled with a power source;
 a solid state converter electrically coupleable with an aircraft at or near an airport gate and configured to provide and maintain power, from the power source, to the aircraft at a power level requested by the aircraft;
a controller;
a first feedback loop between the controller and the current transducer, wherein the first feedback loop provides a first feedback signal generated by the current transducer to the controller;
a second feedback loop between the controller and the solid state converter, wherein the second feedback loop provides a second feedback signal generated by the solid state converter to the controller;
a battery charger electrically coupled with the power source and configured to charge one or more electric vehicles, wherein the battery charger is configured to consume power from the power source in accordance with the first and second feedback signals; and
a battery bank comprising one or more batteries electrically coupled with the battery charger, wherein the battery bank is configured for receiving power from the battery charger through a local battery charging line, and wherein the battery bank is configured for charging a ground support equipment (GSE).

2. The system of claim 1, wherein the controller is configured to determine a maximum available excess power value based on the first and second feedback signals and generate a control signal indicative of the determined maximum available excess power value.

3. The system of claim 2, wherein the battery charger receives the control signal and consumes power from the power source up to the maximum available excess power value indicated in the control signal.

4. The system of claim 1, wherein the current transducer is configured to monitor an amount of power being consumed by the system and generate the first feedback signal indicative of the amount of power being consumed by the system.

5. The system of claim 1, wherein the solid state converter is configured to monitor an amount of power being consumed by the aircraft and generate the second feedback signal indicative of the amount of power being consumed by the aircraft.

6. The system of claim 1, further comprising a central monitoring unit in communication with the controller, wherein the central monitoring unit receives first power consumption data associated with the system and second power consumption data associated with a second system, different from the system, located at or near a second gate of the airport.

7. The system of claim 1, wherein an electrical connection between the system and the power source is located at the airport gate, an airport gate rotunda, an airport rotunda, or airport building.

8. The system of claim 1, wherein the solid state converter is configured to provide aircraft-compatible power or 400 Hertz (Hz) power to the aircraft.

9. An airport electric vehicle charging system comprising:
a current transducer directly electrically coupled with a power source;
a solid state converter electrically coupleable with an aircraft at or near an airport gate and configured to provide and maintain power, from the power source, to the aircraft at a power level requested by the aircraft;
a controller outside of a direct electrical path from the power source to the current transducer;
a battery charger electrically coupled with the power source and configured to charge one or more electric vehicles; and
a battery bank comprising one or more batteries electrically coupled with the battery charger, wherein the battery bank is configured for receiving power from the battery charger through a local battery charging line, and wherein the battery bank is configured for charging a ground support equipment (GSE).

10. The system of claim 9, wherein the solid state converter is configured to consume power from the power source based on:
a first feedback loop between the controller and the current transducer, wherein the first feedback loop provides a first feedback signal generated by the current transducer to the controller; and
a second feedback loop between the controller and the solid state converter, wherein the second feedback loop provides a second feedback signal generated by the solid state converter to the controller.

* * * * *